US006994109B2

(12) United States Patent
Spiess

(10) Patent No.: US 6,994,109 B2
(45) Date of Patent: Feb. 7, 2006

(54) FITTING FOR MEASURING AND REGULATING THE FLOW RATE OF A HYDRAULIC MEDIUM THROUGH A PIPELINE

(75) Inventor: Fritz Spiess, Unterlunkhofen (CH)

(73) Assignee: Watts Industries Deutschland GmbH, Landau (DE)

( * ) Notice: Subject to any disclaimer, the term of this patent is extended or adjusted under 35 U.S.C. 154(b) by 9 days.

(21) Appl. No.: 10/901,031

(22) Filed: Jul. 29, 2004

(65) Prior Publication Data

US 2005/0022609 A1 Feb. 3, 2005

(30) Foreign Application Priority Data

Jul. 31, 2003 (DE) ........................... 203 11 813 U

(51) Int. Cl.
*F16K 37/00* (2006.01)

(52) U.S. Cl. ................. 137/552; 137/625.3; 73/861.74

(58) Field of Classification Search ................ 137/552, 137/625.3, 861.74
See application file for complete search history.

(56) References Cited

U.S. PATENT DOCUMENTS

| | | | | |
|---|---|---|---|---|
| 4,848,926 A * | 7/1989 | Jenkins | 374/142 |
| 5,261,437 A * | 11/1993 | Kalix | 137/1 |
| 5,890,515 A * | 4/1999 | Spiess et al. | 137/552 |
| 6,119,724 A * | 9/2000 | Cazzaniga | 137/552 |
| 6,325,098 B1 * | 12/2001 | Motta et al. | 137/551 |
| 6,349,603 B1 | 2/2002 | Spiess | |

FOREIGN PATENT DOCUMENTS

| | | | |
|---|---|---|---|
| DE | 31 15 572 A1 | 3/1982 |
| DE | 82 20 193.5 G | 10/1982 |
| DE | 35 09 718 C2 | 9/1986 |
| EP | 0 943 901 A1 | 9/1999 |
| EP | 1 130 364 A1 | 9/2001 |
| GB | 2 073 893 A | 10/1981 |

* cited by examiner

*Primary Examiner*—A. Michael Chambers
(74) *Attorney, Agent, or Firm*—Birch, Stewart, Kolasch & Birch, LLP

(57) ABSTRACT

A fitting for measuring the flow rate of a hydraulic medium through a pipeline having a cylindrical fitting housing with a main flow channel includes a flow meter device with a measuring element and an indicator element. A side chamber is formed in a side connecting piece of the fitting housing. The flow meter device is arranged in the opening of the side connecting piece closing it off to the outside. In a measuring bore that forms the forward flow to the side chamber, a rebounding plate of the measuring element is arranged, which is connected by an indicator rod with an indicator of the indicator element. The main flow channel between intake bore and the outlet bore of the fitting is formed by the measuring bore that leads into the side chamber, the side chamber itself, as well as a transverse bore that adjoins the side chamber. As a result, the entire flow of the main channel runs through the side connecting piece with the measuring bore and the side chamber. This allows, by using the flow meter device located in the side connecting piece and closing it off to the outside, to simultaneously measure and regulate the flow rate in the main stream without the flow reaching the indicator element with the inspection glass and the scale.

20 Claims, 2 Drawing Sheets

FITTING FOR MEASURING AND REGULATING THE FLOW RATE OF A HYDRAULIC MEDIUM THROUGH A PIPELINE

This nonprovisional application claims priority under 35 U.S.C. § 119(a) on German Patent Application No. DE 203 11 813.8 filed in Germany on Jul. 31, 2003, which is herein incorporated by reference.

BACKGROUND OF THE INVENTION

1. Field of the Invention

The present invention relates to a fitting for measuring and regulating the flow rate of a medium, for example, a hydraulic medium, through a pipeline.

2. Description of the Background Art

Fittings of this type can be used for various flow mediums; in particular, they are used in heating and cooling systems to indicate the flow of a particular medium in the various branch lines. Physically, the flow indication is a measurement of the instantaneous flow rate (volume per unit of time) in dependence of the flow velocity; an indicator element shows the instant flow rate per unit (L/min.).

Often, such flow meters are combined with throttle elements for adjusting the flow to a certain rate, for example, a ball valve, a valve etc., which are either integrated in the fitting housing or are installed separately in the branch line.

A known flow meter of this type is formed of a cylindrical housing, which can be used in a flow channel in a forward flow (DE 31 15 572 A1). This housing has a pipe segment that is made of transparent material and serves as an inspection glass, in which a piston is movable against the force of a spring, the position of which is determined by the rate and velocity of the flowing medium and is visible through side openings, that is, windows in the housing. A ball valve for regulating the flow is arranged downstream from the measuring and indicator element.

With this device, the flow rate is measured in the main stream, the medium, however, continuously flows through the inspection glass. As a result, deposits settle on the inner wall of the inspection glass and successively decrease the transparency of the inspection glass, until, finally, the indicator is no longer recognizable. The deposits are floating particles, which in systems of this kind are usually distributed in the medium in a certain concentration. The floating particles are mainly dirt particles and residue from corrosion in various system components, for example, pipelines, boilers, heat exchangers, fittings, pumps etc.

Furthermore, the ball valve used in this device for the adjustment of the flow rate is not very well suited for a precise adjustment, because its angle of rotation is only 90 degrees, which severely restricts the dispersement capacity.

In a further known fitting of this class and type and one that is also used in the forward flow, a bypass line is flanged to the outside of the main housing and axis-parallel to the main flow line (DE 82 20 193 U1). The bypass line also has a window and includes, as a measuring section, a pipe segment through which a partial flow passes and which is made of transparent material. Inside the pipe segment is a corresponding movable spring-coil measuring piston, which at the same time is the indicator element. The indicator must be scaled in such a way that the entire flow, that is, primary and secondary flow, is shown.

To eliminate the need of a constant flow through the bypass channel, thus limiting the dirt deposits from the flow medium on the measuring devices, each connector of the bypass channel to the housing has a shut-off valve so that the partial flow only has to be released when the flow rate is to be determined. The manufacture and installation of such a fitting is very costly and labor intensive, in particular, numerous gaskets are needed. Besides, both shut-off valves must be open for a correct measurement; they only serve a purpose when they are completely shut off immediately after taking the measurement.

The disadvantages of a constant flow, or at least a flow during the measuring process, through the transparent pipe segments are avoided by providing a fitting that is also used in the forward flow, whereby a flow meter device having a measuring element and an indicator element, is mounted in the opening of a side connecting piece, thus closing it off to the outside (EP 0 943 901 A1). The side connecting piece thereby forms a side chamber, which in turn forms a bypass channel with its forward and reverse flow. The flow meter device itself is designed so that a rebounding plate of the measuring part that is impacted by the partial flow is arranged in the bore of a pipe segment that feeds the forward flow to the side chamber, and which is connected, via a longitudinally slidable connecting rod that is guided in an axial bore, with an indicator disk of the indicator element that is arranged on the outside of the side connecting piece.

Although this flow meter also has a ball valve for the adjustment of the desired flow rate, the single-hole mounting of the flow meter device significantly simplifies the assembly of the fitting. Its primary advantage, however, is that the indicator element, although wetted by the flow medium, is virtually completely separated from the flow so that the readability stays intact even without maintenance.

Basically, it is also common to combine a flow meter that is used in reverse flow with a distributor valve in such a way that the inspection glass of the flow meter and the closure body of the control valve form a sort of spindle, which, when turned towards the housing, allows both an adjustment of the opening width of the flow opening and the reading of the flow rate at the same time (DE 35 09 718 C2).

Whereas with this known distributor valve the frontal member of the flow meter and the position indicator rod are both movably connected to the valve closure body, thus forming a one-piece spindle, there is also known a flow meter device, which includes a rotatable inspection glass located in a spindle housing as well as a valve closure body, which is non-rotatably connected to the inspection glass but is axially movable (EP 1 130 364 A1). With this fitting, the measuring and indicator device remain stationary, whereas the turning of the inspection glass merely moves the valve closure body up and down in an axial direction for actuating the control valve.

SUMMARY OF THE INVENTION

It is therefore an object of the present invention to provide a fitting, which is used in a forward flow, that on the one hand, allows a measuring of the flow rate directly in the main channel, thus avoiding a measuring of a partial flow and the inaccuracies resulting therefrom, while at the same time providing a reading that is independent from the constant or occasional flow through a transparent inspection glass and, lastly, making it possible to simultaneously read the meter and regulate the flow rate.

The invention is based on the idea that the entire flow of the main line is channeled through a side connecting piece having a measuring bore and side chamber, which is then returned to the main line via a transverse bore. This provides a flow meter device that is arranged in the side connecting piece closing it off to the outside, which allows simultaneous measuring and regulation of the flow rate in the main stream without the flow reaching the indicator element having the inspection glass and the indicator scale. This assures a permanent reading of the actual flow rate in the main channel.

An especially space-saving embodiment of a fitting of this invention is a flow meter device that is, in a way, designed as an oblique-seated valve.

The present invention also allows, apart from regulating the flow rate with the meter device in the main channel of the flow, the addition of a conventional control valve, which can be manually operated or motor-driven.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
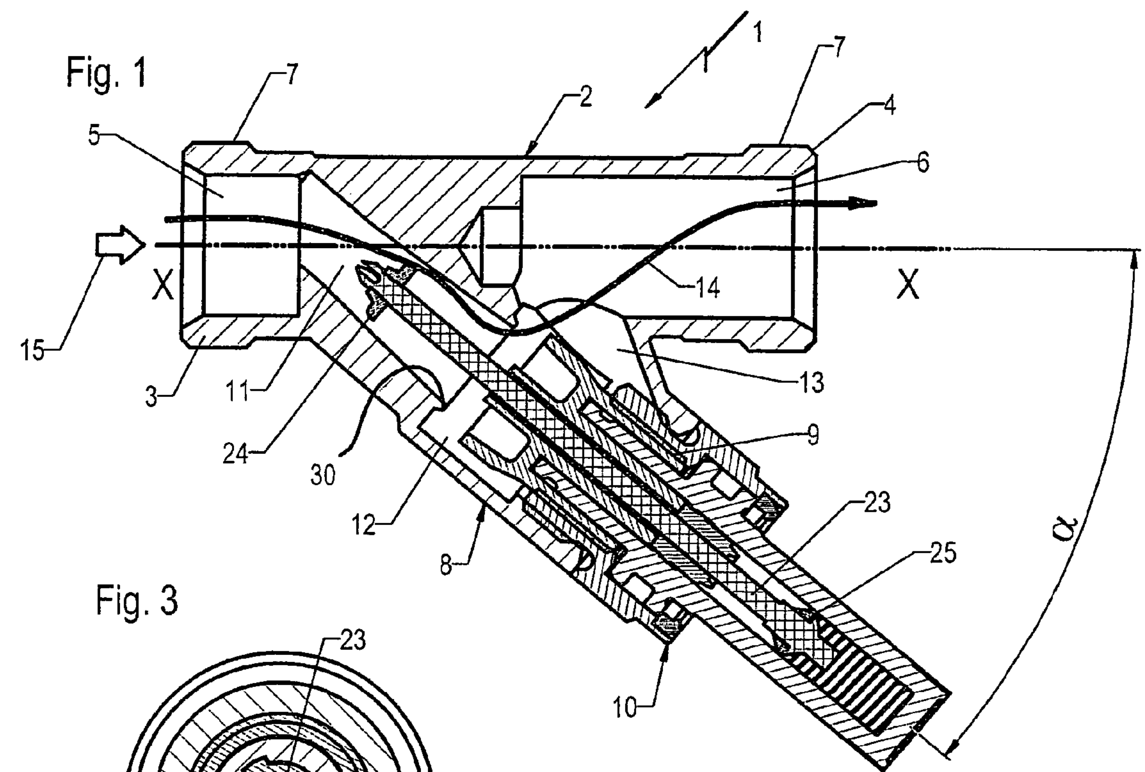
FIG. 1 is a cross section of a fitting having a flow meter device arranged in a side connecting piece, according to a preferred embodiment of the present invention.

The fitting of a branch line control valve 1 as illustrated in a longitudinal section in FIG. 1 includes a cylindrical fitting housing 2 with an intake connecting piece 3 and an outlet connecting piece 4. The intake connecting piece 3 has an intake bore 5, and the outlet connecting piece 4 has an outlet bore 6. Both connecting pieces 3, 4 are designed such as to secure a connection to a pipeline, for example, with an exterior pipe thread 7.

A side connecting piece 8 is formed diagonally to the cylindrical fitting housing 2, at a vertical angle $\alpha$ to the axis X—X of the fitting housing 2. A flow meter device is fixedly attached into the side connecting piece 8, e.g., screwed, at opening 9. The flow meter device is collectively marked with the reference numeral 10. Through the side connecting piece 8, a measuring bore 11 is formed in the area of the fitting housing 2, which is an extension of the intake bore 5. In the side connecting piece 8, the measuring bore 11 extends into a side chamber 12, which in turn opens up again to a transverse bore 13 sideways towards the outlet bore 6. Thus, the main flow channel is formed between the intake bore 5 and the outlet bore 6 through measuring bore 11, side chamber 12, and transverse bore 13, with the arrow line 14 symbolically indicating the main flow channel. The flow direction is indicated with arrow 15.

Figure 3:
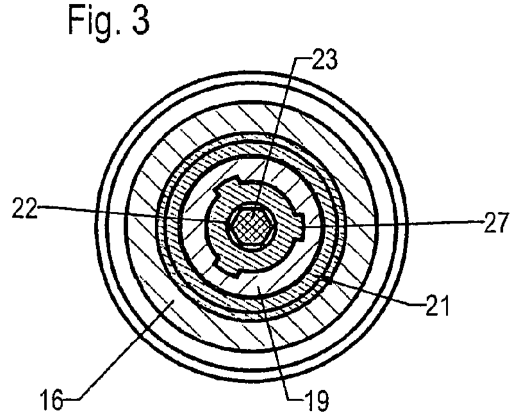
FIG. 3 is a cross section along the line III—III in FIG. 2.
Figure 2:
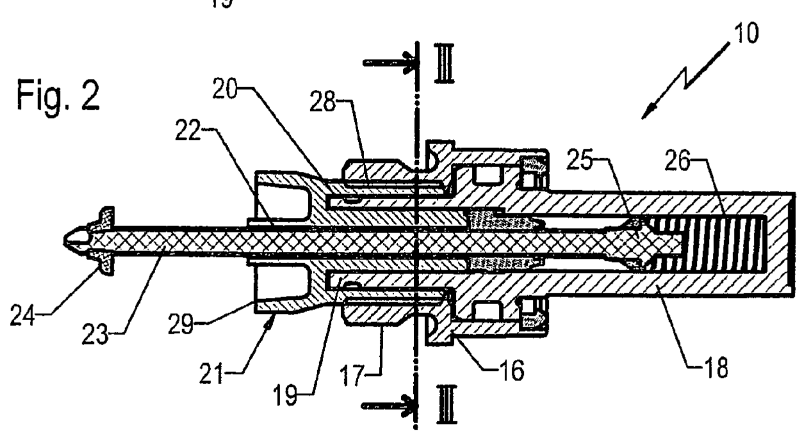
FIG. 2 is a longitudinal section of the flow meter device, according to a preferred embodiment of the present invention.

The flow meter device 10 is illustrated as a separate component in a longitudinal section in FIG. 2, and in FIG. 3 in a cross section along the line III—III of FIG. 2. The flow meter device 10 is illustrated as being somewhat spindle-shaped; it includes a spindle housing 16 having an exterior thread 17, which allows the component to be screwed into the opening 9 of the side connecting piece 8, whereby the opening has a corresponding interior thread. In the spindle housing 16, a transparent inspection glass 18 that has a scale is rotatably held. A lower open end 19 of the inspection glass 18 extends into a ring-shaped recess 20 in a valve closure body 21, which in turn has a central bore 22, in which an indicator rod 23 of the meter device is longitudinally slidable. The indicator rod 23 has a rebounding plate 24 at its lower end and an indicator 25 at its upper end, the indicator 25 being movable against a spring element 26, which can provide a bias force.

On the interior wall of the ring-shaped recess 20, the valve closure body 21 has longitudinal ribs 27 (FIG. 3), which extend into suitable groove-shaped recesses at the lower open end 19 of the inspection glass 18 and are guided therein. On the exterior of the valve closing body 21 there is an exterior thread 28, which interacts with a corresponding interior thread in the spindle housing 16. By rotating the inspection glass 18, which may have a ribbing at its upper end, the valve closure body 21 is also subjected to a rotating movement, which, via the exterior thread 28, causes an axial movement. With this axial movement, the lower front edge 29 of the valve closure body 21 is guided towards a valve seat 30 that is positioned on the fitting housing 2, where the measuring bore 11 and the side chamber 12 join. In this way, the flow rate can be adjusted by a simple rotation of the assembly, and whereby the respective flow rate can be read at any time.

Figure 4:
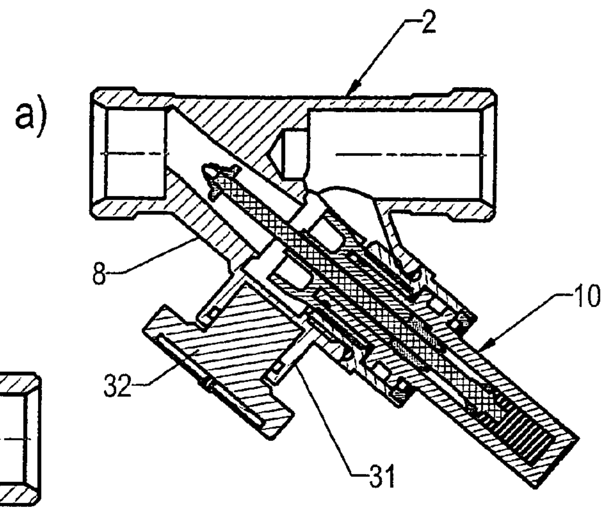
FIGS. 4*a* and 4*b* show a cross section of the fitting illustrated in FIG. 1, with a feature to enable mounting of a system thermometer.
Figure 4:
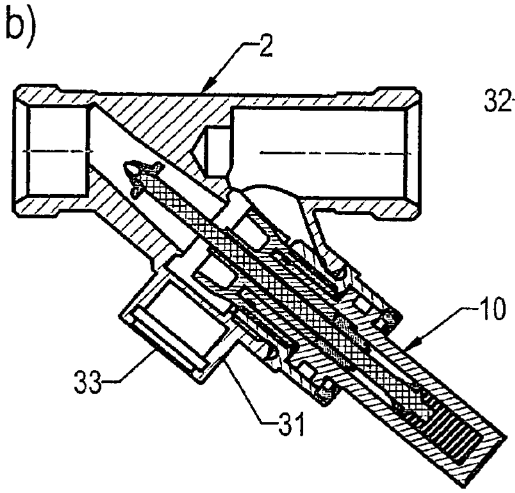

In FIGS. 4*a* and 4*b*, it is also indicated how, for example, an additional connecting piece 31 can be mounted to the side connecting piece 8, so that it forms a pot-shaped recess that can accommodate, in a conventional manner, a system thermometer 32 (FIG. 4*a*). If a system thermometer 32 is not needed, the opening in the connecting piece 31 can be closed with a lid 33 (FIG. 4*b*).

Figure 5:
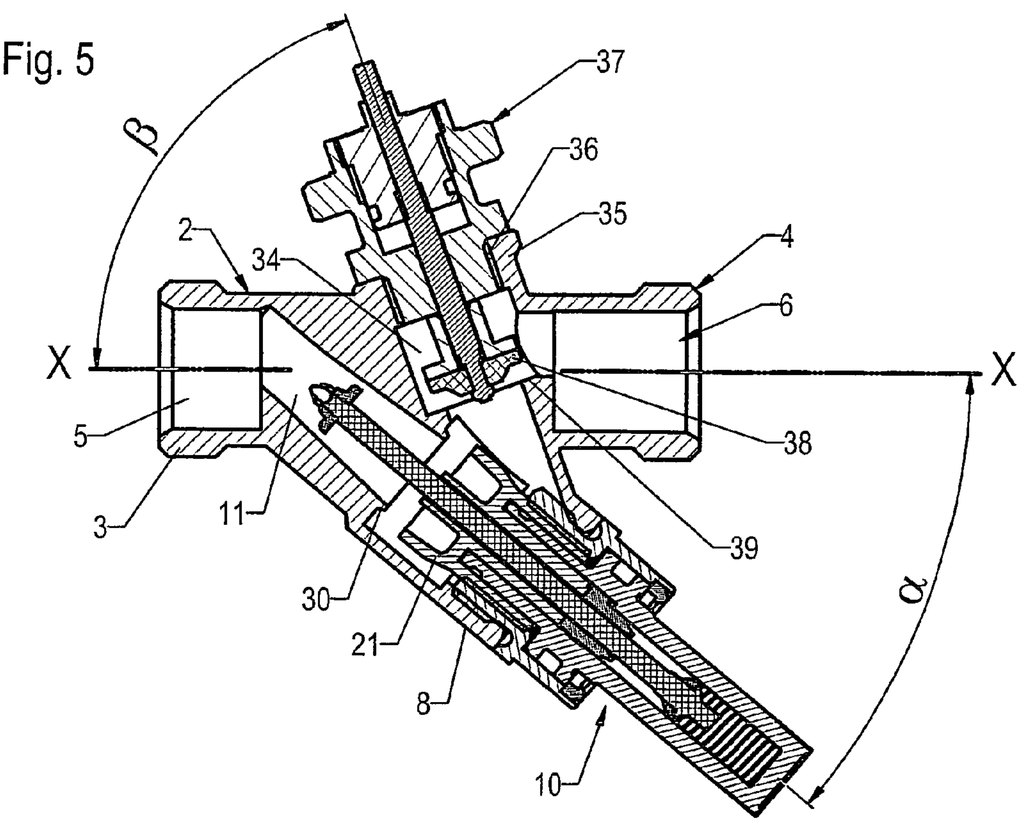
FIG. 5 is a cross section of a fitting having a control valve in addition to the flow meter device, according to an alternate embodiment of the present invention.

FIG. 5 illustrates how the fitting of FIG. 1 can be complemented by a control valve. In this case, the transverse bore 13 extending from the side chamber 12 ends in an additional side chamber 34, which is formed by a further connecting piece 35 that is arranged diametrically to the side connecting piece 8 and on the same plane. While the side connecting piece 8 having the flow meter device 10 is inclined at the vertical angle $\alpha$ towards the main axis X—X of the fitting housing 2, the axis of the connecting piece 35 is inclined at the vertical angle $\beta$ in the direction of the fitting main axis X—X.

In an opening 36 of the connecting piece 35 a conventional control valve 37 is installed, the valve disk 38 of which actuates a valve seat 39, which is formed at the passage of the transverse bore 13 to the side chamber 34. In turn, the side chamber 34 continues directly to the outlet bore 6 of the outlet pipe 4.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A fitting for measuring a flow rate of a medium through a pipeline having a fitting housing with a main flow channel and a flow meter device, which includes a measuring element and an indicator element, the fitting housing has a side connecting piece that forms a side chamber, whereby the flow meter device is arranged at the opening of the side connecting piece thereby substantially sealing the opening, wherein a rebounding plate of the measuring element is arranged in a measuring bore, which forms the forward flow to the side chamber, and which is connected via a longitudinally slidable indicator rod that is guided in an axial bore to an indicator of the indicator element and is arranged outside the side connecting piece, and wherein the main flow channel is formed between an intake bore and an outlet bore of the fitting, which are formed by the measuring bore leading to the side chamber, which also forms the side chamber and an adjoining transverse bore.

2. The fitting according to claim 1, wherein the axis of the side connecting piece is inclined towards an initial flow axis of the fitting housing at an angle $\alpha$.

3. The fitting according to claim 1, wherein the flow meter device includes a rotatable inspection glass, which is arranged in a spindle housing, and a valve closure body, which is non-rotatably, but axially movably connected to the inspection glass, and which actuates a valve seat that is arranged in the fitting housing.

4. The fitting according to claim 3, wherein the fitting housing further includes an additional side connecting piece having a bore that continues into the main flow channel, and wherein a bore opening has a control valve that substantially closes an opening to an environment that is external to the fitting.

5. The fitting according to claim 4, wherein the axis of the side connecting piece is inclined to the initial flow axis at an angle $\beta$.

6. The fitting according to claim 4, wherein, relative to the initial flow axis of the fitting housing, the side connecting piece and additional side connecting piece are arranged diametrical from one another and substantially on the same plane.

7. The fitting according to claim 1, wherein a further connecting piece is arranged on the fitting housing that forms a receptacle for a system thermometer.

8. The fitting according to claim 1, wherein the medium is a hydraulic medium.

9. The fitting according to claim 1, wherein the fitting housing is cylindrical.

10. A fitting for a pipe comprising:

an intake bore for facilitating intake of a medium;

an outlet bore for facilitating discharge of the medium, the intake bore and the outlet bore each having a central axis being generally co-axial;

a measuring bore being provided adjacent to the intake bore, the measuring bore having a measuring axis that is inclined at an angle with respect to the central axes of the inlet and outlet bores;

a side chamber for securing a flow meter device in a receiving opening thereof, the flow meter device being adapted to measure a flow rate of the medium and to control a flow rate of the medium through the side chamber, the side chamber being adapted to direct the medium towards the outlet bore, wherein a substantially similar volume of the medium entering the intake bore is provided towards the outlet bore via the measuring bore and the side chamber.

11. The fitting according to claim 10, wherein the flow meter device includes a rebounding plate being attached to an indicator rod, the rebounding plate extending into the measuring bore, the rebounding plate facilitating flow rate measurement.

12. The fitting according to claim 11, wherein the flow meter device further includes a spring for providing a biasing force against the indicator rod.

13. The fitting according to claim 10, further comprising a transverse bore that is provided between the side chamber and the outlet bore for facilitating flow of the medium from the side chamber to the outlet bore.

14. The fitting according to claim 10, further comprising a thermometer for measuring a temperature of the medium.

15. The fitting according to claim 10, wherein the intake bore and the outlet bore are each adapted to be fixedly secured to an end of the pipe.

16. The fitting according to claim 10, wherein the flow rate of the medium is controlled through the side chamber by a rotation of the flow meter device within the opening of the side chamber.

17. The fitting according to claim 16, wherein the flow meter device is secured by threads to the opening of the side chamber.

18. The fitting according to claim 10, wherein the fitting further includes a control valve for controlling the flow rate of the medium from the side chamber to the outlet bore.

19. The fitting according to claim 10, wherein a flow direction of the medium through the fitting is substantially different than a flow direction into the intake bore.

20. The fitting according to claim 10, wherein the medium is a gaseous medium or a hydraulic medium.

* * * * *